(12) United States Patent
Fukasawa

(10) Patent No.: US 12,483,157 B2
(45) Date of Patent: Nov. 25, 2025

(54) POWER CONVERSION SYSTEM

(71) Applicant: TMEIC Corporation, Tokyo (JP)

(72) Inventor: Issei Fukasawa, Tokyo (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 18/561,491

(22) PCT Filed: May 12, 2022

(86) PCT No.: PCT/JP2022/020055
§ 371 (c)(1),
(2) Date: Nov. 16, 2023

(87) PCT Pub. No.: WO2023/218599
PCT Pub. Date: Nov. 16, 2023

(65) Prior Publication Data
US 2024/0250606 A1    Jul. 25, 2024

(51) Int. Cl.
*H02M 7/48* (2007.01)
*H02H 7/122* (2006.01)
(Continued)

(52) U.S. Cl.
CPC .............. *H02M 7/48* (2013.01); *H02H 7/122* (2013.01); *H02M 7/493* (2013.01); *H02M 7/53871* (2013.01); *H02M 1/32* (2013.01)

(58) Field of Classification Search
CPC ...... H02M 1/0009; H02M 7/48; H02M 7/493; H02M 7/53871; H02H 7/122
See application file for complete search history.

(56) References Cited

U.S. PATENT DOCUMENTS 6,271,655 B1    8/2001 Weber et al.
2020/0044457 A1*    2/2020 Miyake ................. G01R 31/40
(Continued)

FOREIGN PATENT DOCUMENTS

WO    WO 2021/014574 A1    1/2021

OTHER PUBLICATIONS

International Search Report and Written Opinion issued Jul. 12, 2022 in PCT/JP2022/020055 filed on May 12, 2022, 11 pages (with English Translation).

(Continued)

*Primary Examiner* — Jue Zhang
(74) *Attorney, Agent, or Firm* — Oblon, McClelland, Maier & Neustadt, L.L.P.

(57) ABSTRACT

A control apparatus for a power conversion system is a control apparatus for a power conversion system including a power converter connected to a power supply or a capacitor through a wire, a coil disposed at a position around the wire where a magnetic flux is linked with the coil when a short-circuit failure in which a voltage of the power supply or the capacitor is short-circuited occurs, the magnetic flux being generated by the short-circuit failure, and a voltage detection circuit configured to detect a voltage value of a voltage across the coil. The control apparatus includes: a voltage acquisition unit configured to acquire the voltage value of the voltage across the coil detected by the voltage detection circuit; and a failure detection unit configured to detect a short-circuit failure of the power converter, based on the voltage value acquired by the voltage acquisition unit.

9 Claims, 11 Drawing Sheets

(51) Int. Cl.
    *H02M 1/32*     (2007.01)
    *H02M 1/36*     (2007.01)
    *H02M 7/493*     (2007.01)
    *H02M 7/5387*     (2007.01)

(56) References Cited

U.S. PATENT DOCUMENTS

2022/0069698 A1*   3/2022   Fukasawa ............. H02M 1/327
2022/0255486 A1*   8/2022   Hatakeyama ........... H02P 27/08

OTHER PUBLICATIONS

English translation of International Preliminary Report on Patentability and Written Opinion issued Nov. 21, 2024 in PCT/JP2022/020055, 6 pages.

* cited by examiner

POWER CONVERSION SYSTEM

FIELD

The present invention relates to a power conversion system.

BACKGROUND

In an existing power conversion system, for example, a current sensor is provided on a direct-current side of each of unit power converters connected in parallel. When a short-circuit accident occurs, a short-circuit current flowing from a direct-current capacitor toward a short-circuit point is detected by the current sensor, and protection operation is performed to protect the power conversion system (for example, see PTL 1).

CITATION LIST

Patent Literature

[PTL 1] WO 2021/014574

SUMMARY

Technical Problem

However, a current flows through an attachment part of the current sensor that detects the short-circuit current, during normal operation without failure. Therefore, a current sensor having a large rated current corresponding to the current during the normal operation without failure is necessary, which may lead to high cost.

Accordingly, an object of the present disclosure is to provide a technique that can protect a power conversion system with a simple and inexpensive configuration as compared with an existing configuration.

Solution to Problem

A control apparatus for a power conversion system according to an aspect is a control apparatus for a power conversion system including a power converter connected to a power supply or a capacitor through a wire, a coil disposed at a position around the wire where a magnetic flux is linked with the coil when a short-circuit failure in which a voltage of the power supply or the capacitor is short-circuited occurs, the magnetic flux being generated by the short-circuit failure, and a voltage detection circuit configured to detect a voltage value of a voltage across the coil. The control apparatus includes: a voltage acquisition unit configured to acquire the voltage value of the voltage across the coil detected by the voltage detection circuit; and a failure detection unit configured to detect a short-circuit failure of the power converter, based on the voltage value acquired by the voltage acquisition unit.

In the control apparatus according to the aspect, the failure detection unit may detect the short-circuit failure of the power converter when the voltage value exceeds a predetermined threshold.

The control apparatus according to the aspect may further includes an operation control unit configured to, when the failure detection unit detects the short-circuit failure of the power converter, output an operation instruction to protect and stop the power converter.

A power conversion system according to an aspect includes: a power converter connected to a power supply or a capacitor through a wire; a coil disposed at a position around the wire where a magnetic flux is linked with the coil when a short-circuit failure in which a voltage of the power supply or the capacitor is short-circuited occurs, the magnetic flux being generated by the short-circuit failure; a voltage detection circuit configured to detect a voltage value of a voltage across the coil; and any of the above-described control apparatuses.

In the power conversion system according to the aspect, the wire may be any of an electric wire, a busbar, and a printed-circuit board wire.

In the power conversion system according to the aspect, the coil may be any of an electric wire, a busbar, and a printed-circuit board wire.

In the power conversion system according to the aspect, the coil may be electrically insulated from a main circuit.

In the power conversion system according to the aspect, when a plurality of the power converters connected in parallel are connected to the power supply or the capacitor through the wire, the coil may be disposed at a position around the wire connecting the plurality of power converters, the magnetic flux generated by the short-circuit failure being linked with the coil at the position.

Advantageous Effects of Invention

According to the present disclosure, it is possible to provide the technique that can protect the power conversion system with a simple and inexpensive configuration as compared with the existing configuration.

DESCRIPTION OF EMBODIMENTS

Some embodiments of a control apparatus and a power conversion system according to the present disclosure are described below with reference to drawings.

Configuration in First Embodiment

Figure 1:
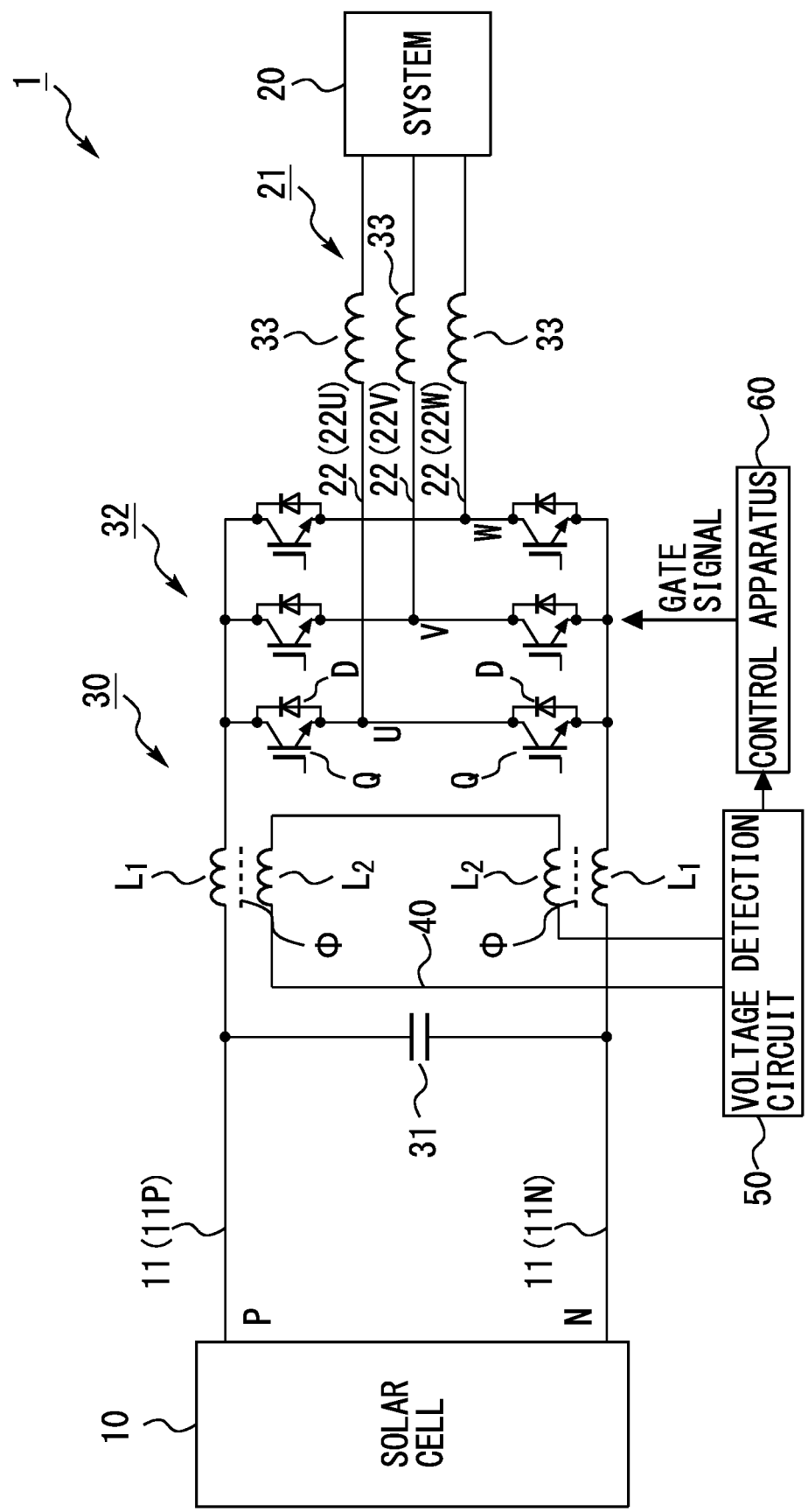
FIG. 1 is a diagram illustrating a configuration example of a power conversion system according to a first embodiment.

FIG. 1 is a diagram illustrating a configuration example of a power conversion system 1 according to a first embodiment.

As illustrated in FIG. 1, the power conversion system 1 includes a direct-current power supply (solar cell) 10, an alternating-current power system (system) 20, a power converter 30, a coil 40, a voltage detection circuit 50, and a control apparatus 60.

For example, the power conversion system (PCS: Power Conditioning System) 1 converts direct-current power supplied from the direct-current power supply 10 into alternating-current power through the power converter 30, and outputs the converted alternating-current power to the alternating-current power system 20.

The direct-current power supply 10 is connected to one end side of the power converter 30 through wires 11, and supplies the direct-current power to the power converter 30 through the one end side. The direct-current power supply 10 may be, for example, a solar cell (PV: Photovoltaics) or a rechargeable battery (ESS: Energy Storage System), or a direct-current power supply system including an aerogenerator and an alternating current/direct current converter. Further, the direct-current power supply 10 may be, for example, a capacitor, a system, or an input/output unit of another power converter. In the following, in the present specification, "solar cell 10" is described as an example of the direct-current power supply 10. Note that the direct-current power supply (solar cell) 10 is an example of "power supply or capacitor".

The wires 11 are conductors (direct-current conductors) connecting the solar cell 10 and the one end side of the power converter 30. In the present specification, the wire 11 on a positive electrode P side is also referred to as "positive electrode wire 11P", and the wire 11 on a negative electrode N side is also referred to as "negative electrode wire 11N". The wires 11 are, for example, electric wires, busbars, or printed-circuit board wires. Each of the wires 11 includes a parasitic inductance (self-inductance) $L_1$. In FIG. 1, the parasitic inductances (self-inductances) $L_1$ (and magnetic fluxes $\Phi$ described below) are intensively illustrated in parts of the wires 11 for convenience, but are actually present over the whole of the wires 11.

The alternating-current power system 20 (hereinafter, also referred to as "system 20") is connected to an output end as another end side of the power converter 30 through the alternating-current circuit 21. The system 20 is, for example, an integrated system of power generation, power transformation, power transmission, and power distribution to supply the alternating-current power output from the power converter 30 to power receiving facilities of consumers. For example, an unspecified load is connected to the system 20. Note that the alternating-current power system (system) 20 is an example of "power supply or capacitor".

One end of the alternating-current circuit 21 is connected to the output end as the other end side of the power converter 30, and another end of the alternating-current circuit 21 is connected to the system 20. The alternating-current circuit 21 is, for example, a three-phase alternating-current circuit of a three-phase three-wire type that supplies three-phase alternating-current power obtained by combining single-phase alternating-current of three systems shifted in phase of the current or voltage from one another, by using three wires 22.

The wires 22 are conductors such as electric wires and cables in the alternating-current circuit 21, and may be, for example, electric wires, busbars, or printed-circuit board wires as with the wires 11. In the present specification, the wires 22 of a U-phase, a V-phase, and a W-phase in the alternating-current circuit 21 are also referred to as "U-phase wire 22U", "V-phase wire 22V", and "W-phase wire 22W", respectively.

The power converter 30 is connected to the solar cell 10 through the wires 11 on the one end side on a left side in FIG. 1, and is connected to the system 20 through the alternating-current circuit 21 (wires 22) on the other end side on a right side in FIG. 1. Further, the power converter 30 is connected to the control apparatus 60 through an unillustrated signal line or the like, and operation of the power converter 30 is controlled by the control apparatus 60. The power converter 30 converts the direct-current power supplied from the solar cell 10 into the alternating-current power, and outputs the alternating-current power to the system 20 under the control of the control apparatus 60.

Note that the power converter 30 is not limited to a power converter converting the direct-current power into the alternating-current power, and may be a power converter converting the direct-current power into the direct-current power or a power converter converting the alternating-current power into the alternating-current power. In this case, the apparatus connected to the one end side of the power converter 30 is not limited to the direct-current power supply (solar cell) 10, and may be an alternating-current power supply. Further, the power converter 30 may convert one or both of active power and reactive power. The power converter 30 may be connected to "power supply or capacitor" on the direct-current side, or the alternating-current side, or both of the alternating-current side and the direct-current side.

The power converter 30 includes a direct-current capacitor 31, an inverter circuit 32, and alternating-current reactors 33.

The direct-current capacitor 31 is a capacitor smoothing variation of an inter-terminal voltage, and is connected between the positive electrode wire 11P and the negative electrode wire 11N of the wires 11. Note that the direct-current capacitor 31 is an example of "power supply or capacitor".

The inverter circuit 32 includes, for example, a plurality of semiconductor switching elements Q such as IGBTs (Insulated Gate bipolar Transistors). The semiconductor switching elements Q are not limited thereto, and may be MOSFETs (metal-oxide-semiconductor field-effect transistors) or the like. One end side of the inverter circuit 32 is connected to the solar cell 10, and another end side as an output side is connected to the system 20 through the alternating-current reactors 33.

The inverter circuit 32 is controlled by a pulse width modulation (PWM) signal that is a gate driving signal (gate signal) of the semiconductor switching elements Q, generated by a PWM control unit 65 (see FIG. 2) described below in the control apparatus 60. The inverter circuit 32 acquires the direct-current power supplied from the solar cell 10 from the one end side, converts the acquired direct-current power into the alternating-current power under the control of the PWM signal (gate signal), and outputs the alternating-current power from another end side as an output end to supply the alternating-current power to the system 20.

The inverter circuit 32 includes, for example, a circuit in which three legs (U-phase leg, V-phase leg, and W-phase leg) are connected in parallel. Each of the legs is configured by, for example, connecting two arms in series. Each of the arms includes the semiconductor switching element Q and a reflux diode D that are connected in reverse parallel. For example, the legs are connected in parallel between the positive electrode wire 11P and the negative electrode wire 11N, and intermediate points of the respective legs are electrically connected to the U-phase wire 22U, the V-phase wire 22V, and the W-phase wire 22W of the alternating-current circuit 21.

The alternating-current reactors 33 are also referred to as AC (alternating-current) reactors, and are connected in series to the alternating-current circuit 21 on the output side of the inverter circuit 32. The alternating-current reactors 33 are, for example, smoothing elements each having an effect of reducing noise and an effect of suppressing a surge voltage. For example, each of the alternating-current reactors 33 configures, together with an unillustrated alternating-current capacitor connected in an L-shape, an LC filter circuit (filter circuit) that reduces ripple (vibration) generated when the semiconductor switching elements Q of the inverter circuit 32 are switched.

The coil 40 is disposed around the wires 11. For example, in a case where a short-circuit failure occurs in a part of the semiconductor switching elements Q of the inverter circuit 32, a circuit voltage of the direct-current capacitor 31 is applied to the parasitic inductances $L_1$ of the wires 11, and magnetic fluxes Φ are generated around the parasitic inductances $L_1$. Therefore, to detect the magnetic fluxes Φ, the coil 40 is disposed at a position around the wires 11 where the magnetic fluxes Ø are linked with the coil 40. In the drawing, a reference numeral $L_2$ denotes a self-inductance of the coil 40. Note that positional relationship between the wires 11 and the coil 40 illustrated in FIG. 1 is illustrative. The positions of the wires 11 and the coil 40 are not limited to the positions illustrated in FIG. 1 as long as the wires 11 and the coil 40 have positional relationship causing linkage of the magnetic fluxes Φ. As described above, in FIG. 1, the parasitic inductances (self-inductances) $L_1$ of the wires 11 and the magnetic fluxes Φ are intensively illustrated in parts of the wires 11 for convenience, but are actually present over the whole of the wires 11. Likewise, the self-inductances $L_2$ of the coil 40 are intensively illustrated in parts of the coil 40 for convenience, but are actually present over the whole of the coil 40.

The coil 40 is, for example, an electric wire, a busbar, or a printed-circuit board wire. It is sufficient for the coil 40 to detect the magnetic fluxes Φ generated when a short-circuit failure occurs, and the coil 40 may be configured by, for example, winding a common electric wire several times. The coil 40 is electrically insulated from a main circuit (for example, wires 11) including the power converter 30, and a large voltage is not applied to the coil 40 unlike the main circuit. Therefore, as compared with a case where the coil 40 is not insulated from the main circuit, the coil 40 may not have high insulation property, and it is unnecessary to increase an insulation distance. Note that both ends of the coil 40 are connected to the voltage detection circuit 50.

The voltage detection circuit 50 is connected to both ends of the coil 40, and constantly detects a voltage value V of a voltage across the coil 40. The voltage detection circuit 50 may detect the voltage value V of the voltage across the coil 40, for example, at every predetermined time interval or in response to an instruction received from an operator or the like through an unillustrated host apparatus or an unillustrated operation unit. The voltage detection circuit 50 may be incorporated in the power converter 30 or the control apparatus 60, or may be incorporated in an unillustrated external apparatus or the unillustrated host apparatus.

The control apparatus 60 is provided, for example, inside or outside the power converter 30. Although wires and the like are omitted in the drawing, the control apparatus 60 is electrically connected to elements including the inverter circuit 32 of the power converter 30, and the voltage detection circuit 50 by cables or radio. The control apparatus 60 may be realized as a function of an unillustrated inverter control circuit.

The control apparatus 60 includes a processor 91 (see FIG. 10) described below that operates by executing programs, such as a CPU (Central Processing Unit), an MPU (Micro Processing Unit), and a GPU (Graphics Processing Unit). The control apparatus 60 includes a storage unit 70 (see FIG. 2), a memory 92 (see FIG. 10), and the like described below, and totally controls operation of the power converter 30 by executing predetermined programs stored in, for example, the storage unit 70 or the memory 92 to operate the processor 91. Note that the control apparatus 60 may operate in response to an instruction received from, for example, the operator through the unillustrated host apparatus or the unillustrated operation unit. The control apparatus 60 detects a short-circuit failure in the semiconductor switching elements Q and the like, based on a magnitude of the voltage value V of the voltage across the coil 40 detected by the voltage detection circuit 50.

Figure 2:
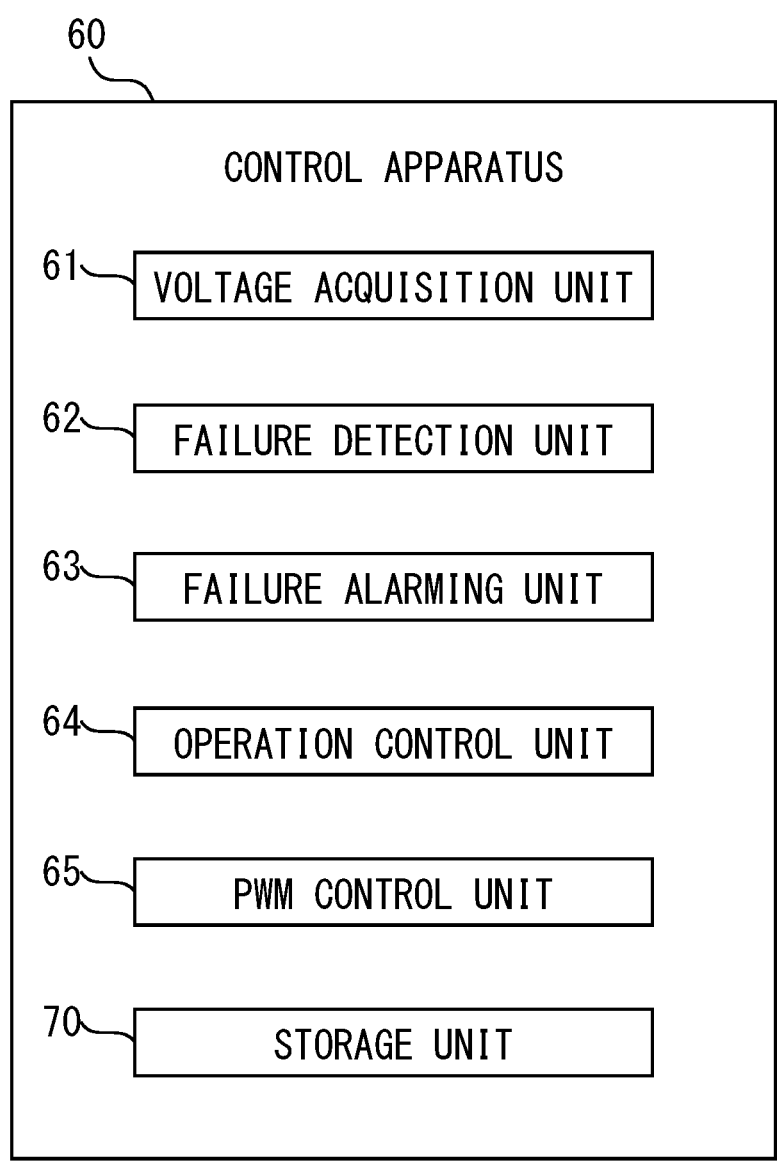
FIG. 2 is a diagram illustrating a configuration example of a control apparatus in the power conversion system illustrated in FIG. 1.

FIG. 2 is a diagram illustrating a configuration example of the control apparatus 60 in the power conversion system 1 illustrated in FIG. 1.

The control apparatus 60 includes the storage unit 70, and functions as the following units by executing predetermined programs stored in, for example, the storage unit 70 or the memory 92 (see FIG. 10) described below. More specifically, the control apparatus 60 functions as a voltage acquisition unit 61, a failure detection unit 62, a failure alarming unit 63, an operation control unit 64, and the PWM control unit 65 by executing the predetermined programs. The above-described functions may be realized by programs executed by the processor 91 (see FIG. 10) held by the control apparatus 60, or may be realized by hardware 93 (see FIG. 10). The above-described units perform the following processing by executing the predetermined programs.

The voltage acquisition unit 61 is connected to the voltage detection circuit 50, and constantly acquires the voltage value V of the voltage across the coil 40 detected by the voltage detection circuit 50. The voltage acquisition unit 61 may acquire the voltage V of the voltage across the coil 40, for example, at every predetermined time interval or in response to an instruction received from the operator or the like through the unillustrated host apparatus or the unillustrated operation unit.

The failure detection unit 62 detects a short-circuit failure in the semiconductor switching elements Q and the like, based on the magnitude of the voltage value V of the voltage across the coil 40 acquired by the voltage acquisition unit 61. The failure detection unit 62 compares, for example, the voltage value V of the voltage across the coil 40 acquired by the voltage acquisition unit 61, with a predetermined threshold stored in the storage unit 70 or the memory 92 (see FIG. 10) described below. For example, when the voltage value V is greater than the predetermined threshold, the failure detection unit 62 detects a short-circuit failure in the semiconductor switching elements Q and the like. Note that the failure detection unit 62 may calculate a predetermined determination value based on current conditions, simulation results, and the like, and may compare the calculated predetermined determination value with the voltage value V of the voltage across the coil 40 to detect a short-circuit failure. When the short-circuit failure is detected, the failure detection unit 62 outputs information indicating that the short-circuit failure has been detected, to at least one of the failure alarming unit 63 and the operation control unit 64.

When acquiring the information indicating that the short-circuit failure has been detected, from the failure detection unit 62, the failure alarming unit 63 issues failure information. The failure alarming unit 63 issues the failure information by, for example, outputting the failure information to the unillustrated host apparatus and the like, or displaying a warning, an alarm, or the like on an unillustrated display unit or an unillustrated operation unit of the power converter 30. Note that the failure alarming unit 63 may issue the failure information to the operation control unit 64.

When acquiring the information indicating that the short-circuit failure has been detected, from the failure detection unit 62 or receiving the failure information issued from the failure alarming unit 63, the operation control unit 64 provides operation instructions to the units of the power converter 30 to protect and stop the power converter 30. For example, the operation control unit 64 may provide an operation instruction to the PWM control unit 65 to protect and stop (gate block) the switching operation of the semiconductor switching elements Q, thereby protecting and stopping the power converter 30. Alternatively, the operation control unit 64 may perform protection operation, for example, opening of an unillustrated breaker (switch) of the power converter 30, thereby protecting the power converter 30. The operation control unit 64 may perform protection operation, for example, opening of an unillustrated breaker (switch) between the power converter 30 and another power converter 30 connected in parallel or the solar cell 10, thereby preventing failure expansion in the power conversion system 1. The operation control unit 64 may provide an operation instruction to protect and stop the power converter 30 in response to an instruction received from, for example, the operator through the unillustrated host apparatus or the unillustrated operation unit.

Note that the control apparatus 60 may include the functions of at least one of the failure alarming unit 63 and the operation control unit 64, and the functions may be provided in an external apparatus such as the unillustrated host apparatus.

The PWM control unit 65 performs PWM control based on, for example, a predetermined output voltage instruction signal and a carrier signal having a predetermined triangular waveform, and generates the gate signal to turn on or off the semiconductor switching elements Q of the inverter circuit 32. The PWM control unit 65 controls operation of the inverter circuit 32 by outputting the generated gate signal to the inverter circuit 32 of the power converter 30. When receiving an operation instruction to protect and stop the power converter 30, from the operation control unit 64, the PWM control unit 65 controls operation of the inverter circuit 32 to stop operation of the semiconductor switching elements Q, and protects and stops the power converter 30.

The storage unit 70 is a volatile or nonvolatile storage medium such as an HDD (Hard Disk Drive), an SSD (Solid State Drive), a DRAM (Dynamic Random Access Memory), and other semiconductor memories. For example, the storage unit 70 stores programs necessary for operation of the units of the control apparatus 60, and writing and reading of various kinds of information to/from the storage unit 70 are performed by each of the units of the control apparatus 60. The storage unit 70 stores the voltage value V of the voltage across the coil 40 acquired by the voltage acquisition unit 61, the predetermined threshold used for failure detection by the failure detection unit 62, and the like.

The storage unit 70 is connected to the units of the control apparatus 60 through, for example, an unillustrated bus. Note that the storage unit 70 may be provided outside the control apparatus 60 and connected to the control apparatus 60 by a cable or radio. The storage unit 70 may be an external storage medium such as a memory card and a DVD (Digital Versatile Disc), an online storage, or the like. Further, the storage unit 70 may be used in common with the memory 92 (see FIG. 10) described below.

Operation in First Embodiment

Figure 3:
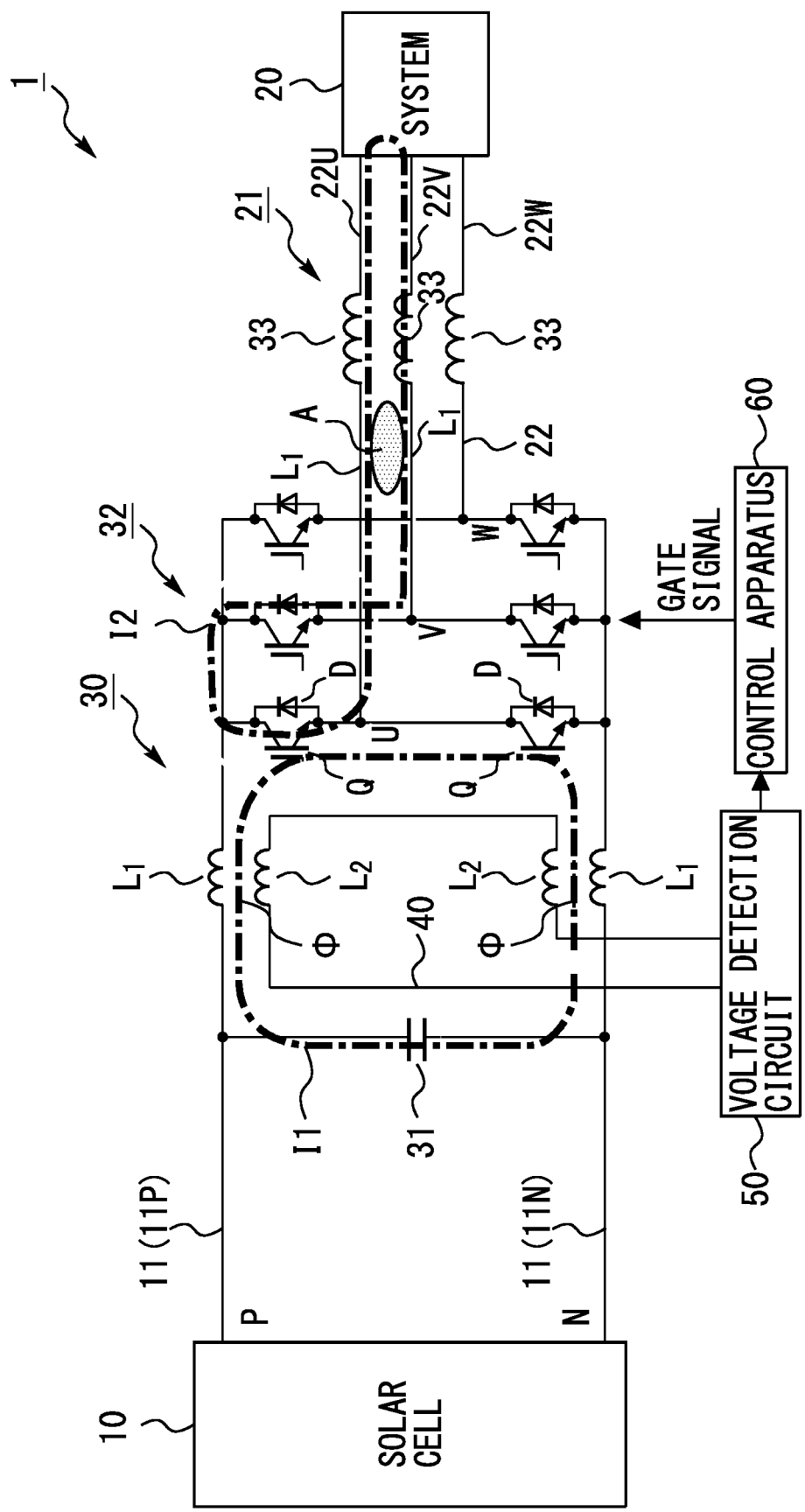
FIG. 3 is a diagram illustrating an example of short-circuit failure detection operation by the control apparatus in the power conversion system illustrated in FIG. 1 and FIG. 2.

FIG. 3 is a diagram illustrating an example of short-circuit failure detection operation by the control apparatus 60 in the power conversion system 1 illustrated in FIG. 1 and FIG. 2.

For example, when a short-circuit failure of the U-phase semiconductor switching elements Q occurs in the power converter 30, a loop short-circuit current I1 flows, the circuit voltage of the direct-current capacitor 31 is applied to the parasitic inductances $L_1$ of the wires 11 of the power converter 30, and the magnetic fluxes Φ are generated therearound. The loop short-circuit current I1 may pass through a direct-current voltage source such as the solar cell 10.

At this time, as described with reference to FIG. 1 and FIG. 2, the coil 40 is disposed around the wires 11 (electric wires, busbars, printed-circuit board wires, etc.) of the circuit such that the magnetic fluxes Φ generated by a short-circuit failure are linked with the coil 40. Further, the voltage value V of the voltage across the coil 40 is detected by the voltage detection circuit 50. In this case, the voltage acquisition unit 61 of the control apparatus 60 acquires the voltage value V of the voltage across the coil 40 detected by the voltage detection circuit 50. Further, the failure detection unit 62 of the control apparatus 60 compares the voltage value V with the predetermined threshold, and in a case where the voltage value V exceeds the predetermined threshold, the failure detection unit 62 detects a short-circuit failure.

When acquiring the information indicating that the short-circuit failure has been detected, the failure alarming unit 63 of the control apparatus 60 issues the failure information, and the operation control unit 64 of the control apparatus 60 provides the operation instructions to the units of the power converter 30 to protect and stop the power converter 30. For example, the PWM control unit 65 of the control apparatus 60 controls the operation of the inverter circuit 32 to protect and stop the power converter 30. This makes it possible to protect the power conversion system 1, and to prevent failure expansion.

In the above description, the example in which the direct-current capacitor 31 is connected to the power converter 30, short circuit of the voltage charged in the direct-current capacitor 31 is detected, and protection of the power conversion system 1 and prevention of failure expansion are performed is described. However, this is not limitative. Even in a case where a power supply such as a solar cell, a rechargeable battery, and a system is connected to the power converter 30 and a voltage of the power supply is short-circuited, the power conversion system 1 can be protected and failure expansion can be prevented by performing operation similar the above-described operation.

In a case where the short-circuit failure occurs in the semiconductor switching elements Q in the power converter 30, for example, a short-circuit current I2 may flow through a loop of the semiconductor switching elements Q, the U-phase wire 22U, and the V-phase wire 22V in the alternating-current circuit 21. In this case, the voltage of the system 20 is applied to the parasitic inductances $L_1$ of the wires 22 of the power converter 30, and the magnetic fluxes Φ are generated therearound. Therefore, the coil 40 may be disposed around the wires 22 such that the magnetic fluxes Φ generated by the short-circuit failure are linked with the coil 40. For example, the coil 40 may be disposed at a position A in FIG. 3.

Operation Principle in First Embodiment

Figure 4A:
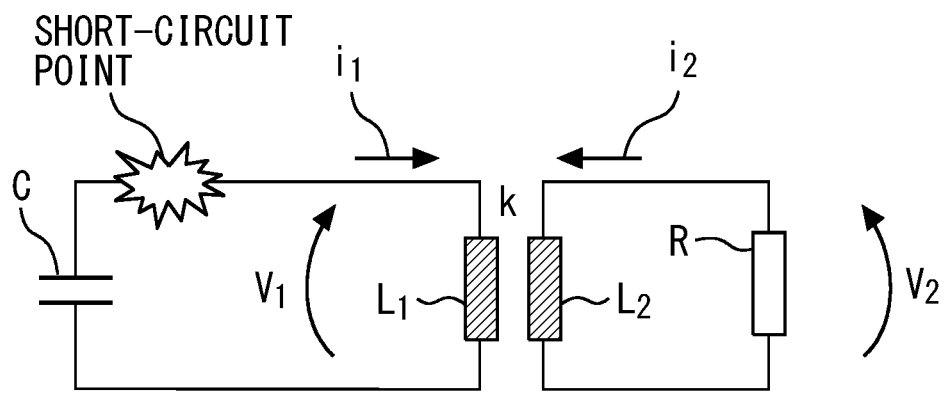
FIG. 4 is a diagram to explain an operation principle of the short-circuit failure detection operation by the control apparatus in the power conversion system illustrated in FIG. 1 to FIG. 3.
Figure 4B:
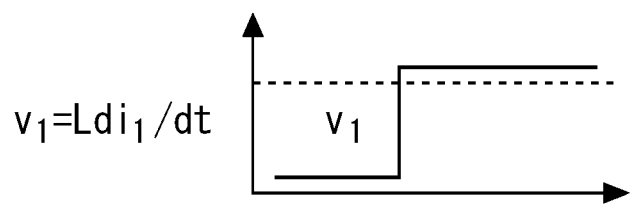
Figure 4C:
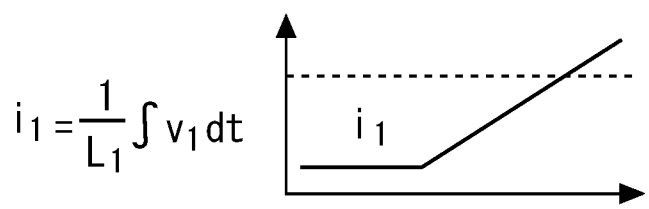

FIG. 4 is a diagram to explain an operation principle of the short-circuit failure detection operation by the control apparatus 60 in the power conversion system 1 illustrated in FIG. 1 to FIG. 3. FIG. 4A is a diagram illustrating an equivalent circuit when a short-circuit failure occurs in the power conversion system 1 illustrated in FIG. 1 to FIG. 3. FIG. 4B is a diagram illustrating voltage variation occurring when the short-circuit failure occurs in the equivalent circuit in FIG. 4A. FIG. 4C is a diagram illustrating current variation occurring when the short-circuit failure occurs in the equivalent circuit in FIG. 4A.

For example, in a case where a short-circuit failure causing short circuit of the voltage of the charged capacitor occurs, a closed circuit is formed by the capacitor, a short-circuit point, and a wire therebetween. The wire used herein is configured by, for example, an electric wire, a busbar, or a printed-circuit board wire. In a case where an impedance of each of the capacitor and the short-circuit point is sufficiently small, most of the voltage of the capacitor is shared by the parasitic inductance (self-inductance) of the wire, and magnetic fluxes are generated around the wire. Further, it is assumed that the coil is disposed such that the above-described magnetic fluxes are linked with the coil. The coil is configured by, for example, an electric wire, a busbar, or a printed-circuit board wire.

At this time, when the parasitic inductance (self-inductance) of the wire is denoted by $L_1$, the self-inductance of the coil is denoted by $L_2$, a coupling degree between the parasitic inductance $L_1$ of the wire and the self-inductance $L_2$ of the coil is denoted by k, and a load resistance of the coil is denoted by R, the equivalent circuit in FIG. 4A can be drawn.

Note that the "coupling degree k" is also referred to as a "coupling coefficient k", and indicates a coupling degree of magnetic fluxes between two windings (between short circuit loop on left side and coil on right side in case of FIG. 4A). The coupling degree k is represented by a value between 0 and 1. For example, the coupling degree k of 1 indicates relationship in which the magnetic fluxes generated in one of the windings entirely penetrate (are linked with) the other winding without leakage. In contrast, for example, the coupling degree k of 0 indicates relationship in which the magnetic fluxes generated in one of the windings do not penetrate (are not linked with) the other winding at all. Therefore, the phrase "magnetic fluxes generated by short circuit are linked with" means that the coupling degree k is greater than 0 (between 0 and 1), and the coupling degree k is preferably close to 1.

A mutual inductance M between the parasitic inductance $L_1$ of the wire and the self-inductance $L_2$ of the coil is given by the following expression (1).

[Math. 1]
$$M = k\sqrt{L_1 L_2} \tag{1}$$

At this time, in the equivalent circuit illustrated in FIG. 4A, a circuit equation represented by the following expression (2) is established, where $i_1$ is a current of the parasitic inductance $L_1$ of the wire, $i_2$ is a current of the self-inductance $L_2$ of the coil, and s is a Laplace operator. Further, $v_1$ corresponds to a voltage divided for the parasitic inductance $L_1$ of the wire, of the capacitor voltage, and $v_2$ is a voltage applied to the load resistance R of the coil.

[Math. 2]
$$\begin{cases} v_1 = sL_1 i_1 + sMi_2 \\ v_2 = sMi_1 + sL_2 i_2 \\ v_2 = -Ri_2 \end{cases} \tag{2}$$

When the currents $i_1$ and $i_2$ are removed from the equations represented by the expression (2), and the equations are transformed, the following expression (3) (relational equation of voltages on primary side and secondary side) is obtainable.

[Math. 3]
$$v_2 = k\sqrt{\frac{L_2}{L_1}} \frac{1}{1 + s\frac{(1-k^2)L_2}{R}} v_1 \tag{3}$$

From the expression (3), the voltage $v_2$ is a first-order lag response of the voltage $v_1$, and a time constant is given by the following expression (4).

[Math. 4]
$$(1-k^2)L_2/R \tag{4}$$

After a time sufficiently longer than the time constant represented by the expression (4) elapses, the voltage $v_2$ is substantially proportional to the voltage $v_1$. In other words, as represented by the expression (4), the time constant of the first-order lag system corresponds to a part of the coefficient s in the expression (3). Therefore, when this is small, the time constant of the first-order lag system is reduced, and the voltage $v_2$ is substantially proportional to the voltage $v_1$. Accordingly, when the voltage across the coil is measured by the voltage detection circuit having a sufficiently large input impedance, it is possible to detect a voltage substantially proportional to the voltage of the capacitor short-circuited when the short-circuit accident occurs.

FIG. 4B is a diagram illustrating voltage variation occurring when the short-circuit failure occurs in the equivalent circuit in FIG. 4A, a vertical axis indicates a voltage, and a lateral axis indicates a time. FIG. 4C is a diagram illustrating current variation occurring when the short-circuit failure occurs in the equivalent circuit in FIG. 4A, a vertical axis indicates a current, and a lateral axis indicates a time. In FIG. 4B and FIG. 4C, a dashed line in a lateral direction indicates a predetermined threshold to detect a short-circuit failure. Note that, in FIG. 4B and FIG. 4C, a circuit on the secondary side is ignored.

In the equivalent circuit illustrated in FIG. 4A, the current $i_1$ is substantially proportional to a product of a reciprocal of the parasitic inductance $L_1$ of the circuit loop configured by the short circuit and a time integration value of the short-circuited voltage $v_1$ as illustrated in FIG. 4C. Therefore, for example, relative to the voltage variation occurring when the short-circuit occurs illustrated in FIG. 4B, variation of the current $i_1$ illustrated in FIG. 4C is delayed.

For example, when the short-circuit failure illustrated in FIG. 4A occurs, the voltage $v_1$ is applied to the parasitic inductance $L_1$ in a stepwise manner as illustrated in FIG. 4B. In the above-described principle, although being the first-order lag response, the first-order lag time constant can be made small considerably. Therefore, the voltage substantially proportional to this waveform can be detected without delay. In contrast, the current $i_1$ is an integration value of the voltage $v_1$. Therefore, the current $i_1$ is delayed in principle as illustrated in FIG. 4C.

Therefore, the method for detecting the voltage variation occurring when the short-circuit occurs illustrated in FIG. 4B based on the predetermined threshold enables high-speed detection of the short-circuit failure in principle as compared with the method for detecting the current variation illustrated in FIG. 4C.

According to the above-described principle, the control apparatus 60 in the power conversion system 1 illustrated in FIG. 1 to FIG. 3 can detect the short-circuit failure without delay by acquiring the voltage value V of the voltage across the coil 40 detected by the voltage detection circuit 50 and comparing the voltage value V with the predetermined threshold.

Action and Effects by First Embodiment

As described above, in the first embodiment illustrated in FIG. 1 to FIG. 4, the coil 40 is disposed at the position around the wires 11 or the wires 22 where the magnetic fluxes Φ are linked with the coil 40 when the short-circuit failure in which the voltage of the power supply such as the solar cell 10, the direct-current capacitor 31, and the system 20 is short-circuited occurs, the magnetic fluxes Φ being generated by the short-circuit failure. Further, the voltage value V of the voltage across the coil 40 is detected by the voltage detection circuit 50, and the detected voltage value V of the voltage across the coil 40 is acquired by the control apparatus 60. When the acquired voltage V exceeds the predetermined threshold, the control apparatus detects the short-circuit failure of the power converter 30, and performs protective stop of the power converter 30 and protection operation such as opening of the unillustrated breaker. Thus, according to the first embodiment illustrated in FIG. 1 to FIG. 4, it is possible to protect the power conversion system 1 and to prevent failure expansion in the power conversion system 1, with a simple and inexpensive configuration as compared with the existing configuration.

Further, according to the first embodiment illustrated in FIG. 1 to FIG. 4, as described with reference to FIG. 4, the current $i_1$ generated when the short-circuit failure occurs is substantially proportional to the product of the reciprocal of the parasitic inductance $L_1$ of the circuit loop configured by the short circuit and the time integration value of the short-circuited voltage $v_1$. Therefore, the current $i_1$ is delayed relative to the voltage variation occurring when the short circuit occurs. Thus, according to the first embodiment illustrated in FIG. 1 to FIG. 4, the short-circuit failure can be detected at high speed in principle as compared with the method for detecting the short-circuit current I1.

Further, according to the first embodiment illustrated in FIG. 1 to FIG. 4, the coil 40 to detect the magnetic fluxes Φ generated when the short-circuit failure occurs can be created by winding a common electric wire several times. Thus, according to the first embodiment illustrated in FIG. 1 to FIG. 4, it is possible to protect the power conversion system 1 and to prevent failure expansion in the power conversion system 1, with a simple and inexpensive configuration as compared with the existing configuration.

Further, according to the first embodiment illustrated in FIG. 1 to FIG. 4, the coil 40 to detect the magnetic fluxes Φ generated when the short-circuit failure occurs is electrically insulated from the main circuit including the power converter 30. Thus, according to the first embodiment illustrated in FIG. 1 to FIG. 4, it is possible to protect the power conversion system 1 and to prevent failure expansion in the power conversion system 1, with a simple and inexpensive configuration as compared with a case where the voltage variation occurring when the short-circuit failure occurs is directly measured and detected.

Further, according to the first embodiment illustrated in FIG. 1 to FIG. 4, the coil 40 to detect the magnetic fluxes Φ generated when the short-circuit failure occurs can be created by winding a common electric wire several times, and is electrically insulated from the main circuit including the power converter 30. Thus, according to the first embodiment illustrated in FIG. 1 to FIG. 4, the coil 40 can be installed afterward in the existing power conversion system 1, and the existing power conversion system 1 can be protected afterward.

Modification of First Embodiment

Figure 5:
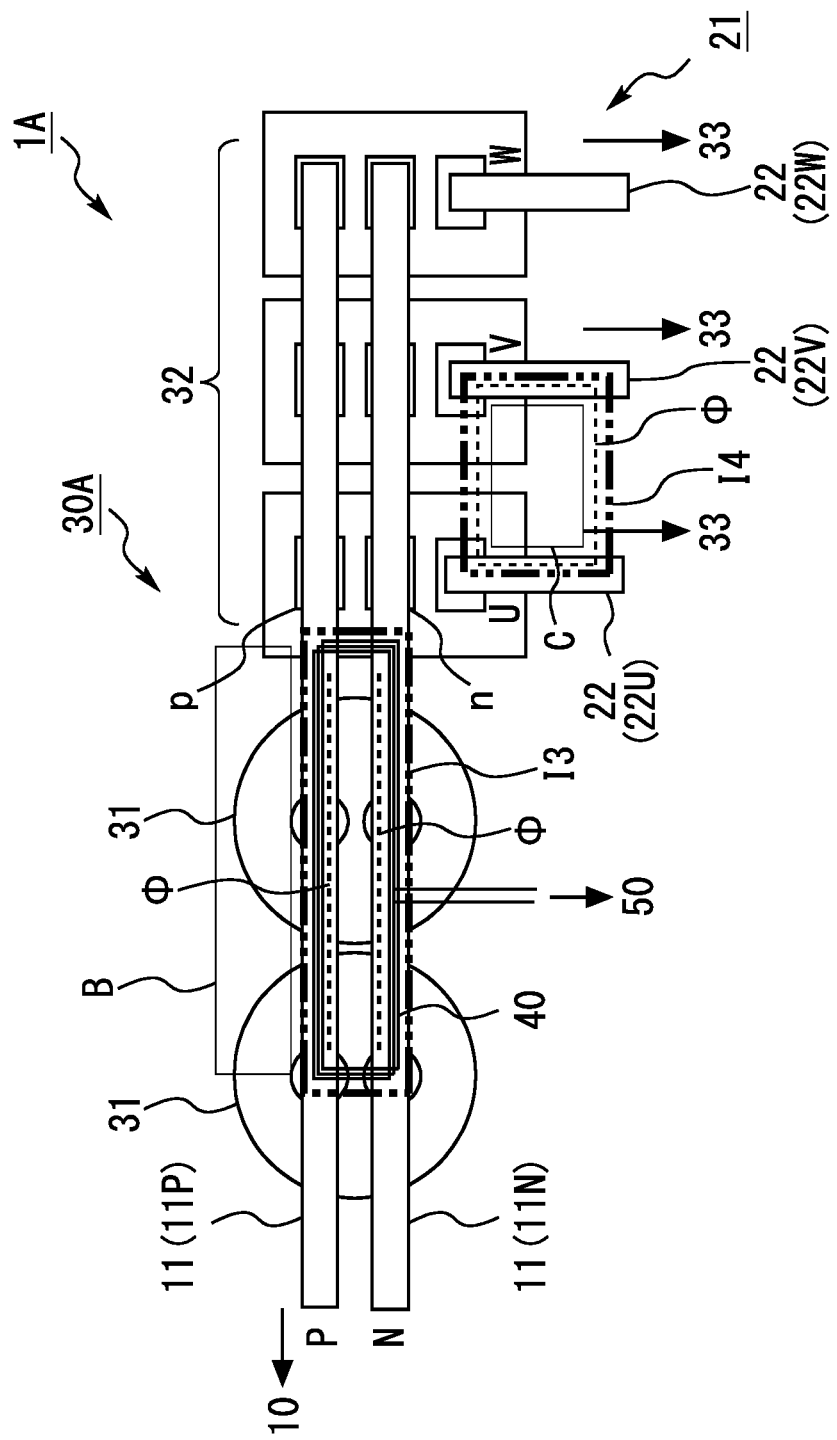
FIG. 5 is a diagram illustrating a configuration example of a power converter according to a modification of the first embodiment.

FIG. 5 is a diagram illustrating a configuration example of a power converter 30A according to a modification of the first embodiment. In the embodiment illustrated in FIG. 5, the components same as or similar to the components in the embodiment illustrated in FIG. 1 to FIG. 4 are denoted by the same reference numerals, and detailed description of the components is omitted or simplified. In FIG. 5, for simplification of the drawing, the components same as or similar to the components in the embodiment illustrated in FIG. 1 to FIG. 4 are partially omitted or illustrated in a simplified manner.

The power converter 30A illustrated in FIG. 5 has a configuration substantially similar to the configuration of the power converter 30 illustrated in FIG. 1, but some of the components are changed. In the power converter 30A, two direct-current capacitors 31 are disposed in parallel, and three semiconductor modules configuring the inverter circuit 32 are disposed and are connected by busbars configuring the wires 11.

In this case, when a short-circuit failure occurs between a p-terminal and an n-terminal of the semiconductor modules (inverter circuit 32), a loop short-circuit current I3 flows from the direct-current capacitors 31 to a short-circuit point of the semiconductor modules. The magnetic fluxes Φ are generated at a position where the current is looped. Therefore, in the embodiment illustrated in FIG. 5, the coil 40 is disposed on the loop of the short-circuit current I3 in order to pick up the magnetic fluxes Φ.

Further, in the embodiment illustrated in FIG. 5, the two direct-current capacitors 31 are disposed in parallel. Since the parasitic inductance $L_1$ is generated between the two direct-current capacitors 31 disposed in parallel, the coil 40 also picks up the voltage applied to the parasitic inductance $L_1$. Note that the coil 40 can be disposed at any position where the magnetic fluxes Φ generated by the loop of the short-circuit current I3 are linked with the coil 40, and may be disposed at, for example, a position B in FIG. 5.

In a case where an installation position of the coil 40 where the magnetic fluxes Φ generated by the loop of the short-circuit current I3 are linked with the coil 40 is not easily known, a direction and a magnitude of the magnetic fluxes generated around the short-circuit current I3 may be roughly calculated based on laws of electromagnetics, and the coil 40 may be disposed such that the magnetic fluxes having a sufficient magnitude are linked with the coil 40.

Alternatively, the magnetic fluxes generated around the loop of the short-circuit current I3 may be calculated by numerical analysis using a computer, and the coil 40 may be disposed such that the magnetic fluxes having a sufficient magnitude are linked with the coil 40.

For example, when the short-circuit failure occurs on the alternating-current side of the semiconductor modules (inverter circuit 32), a loop short-circuit current I4 flows. Therefore, the coil 40 may be disposed at, for example, a position C in FIG. 5 on the loop of the short-circuit current I4 in order to pick up the magnetic fluxes Φ by the loop of the short-circuit current I4.

As described above, according to the modification of the first embodiment illustrated in FIG. 5, it is possible to achieve effects similar to the effects by the first embodiment illustrated in FIG. 1 to FIG. 4.

Second Embodiment

Figure 6:
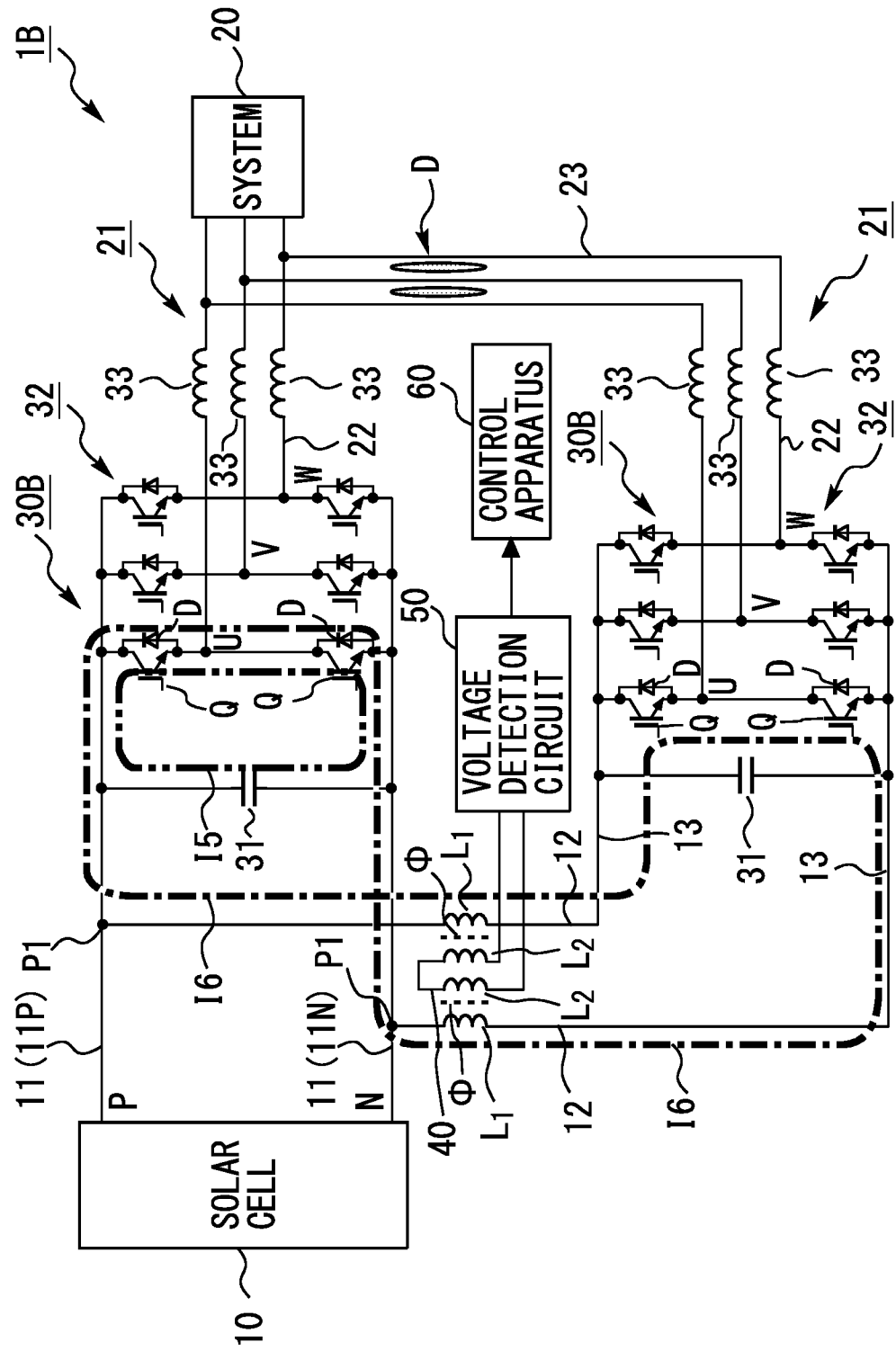
FIG. 6 is a diagram illustrating a configuration example of a power conversion system according to a second embodiment.

FIG. 6 is a diagram illustrating a configuration example of a power conversion system 1B according to a second embodiment. In the embodiment illustrated in FIG. 6, the components same as or similar to the components in the embodiment illustrated in FIG. 1 to FIG. 5 are denoted by the same reference numerals, and detailed description of the components is omitted or simplified.

In the power conversion system 1B illustrated in FIG. 6, two power converters 30B each having a configuration similar to the configuration of the power converter 30 illustrated in FIG. 1 are connected in parallel. More specifically, the wires 11 connected to the upper power converter 30B are branched at connection points P1, and are connected to wires 13 connected to the lower power converter 30B through wires 12 extending in a vertical direction in FIG. 6. In other words, the wires 12 extending in the vertical direction are wires connecting the upper power converter 30B and the lower power converter 30B.

In this case, in a case where a short-circuit failure occurs in the U-phase semiconductor switching elements Q of the upper power converter 30B in FIG. 6, a loop short-circuit current I5 flows from the direct-current capacitor 31 of the upper power converter 30B. In addition, separately from the loop short-circuit current I5, a loop short-circuit current I6 flows from the direct-current capacitor 31 of the lower power converter 30B.

In the embodiment illustrated in FIG. 1 to FIG. 4, the coil 40 is disposed at a position where the loop short-circuit current I5 flows. More specifically, in the embodiment illustrated in FIG. 1 to FIG. 4, the coil 40 is disposed at a position where a voltage applied to the parasitic inductances $L_1$ between the direct-current capacitor 31 and the semiconductor switching elements Q in the upper power converter 30B is detectable.

In this case, however, for example, when a short-circuit failure occurs in the lower power converter 30B, the voltage applied to the parasitic inductances $L_1$ between the direct-current capacitor 31 and the semiconductor switching elements Q in the lower power converter 30B cannot be detected. Therefore, in a case of the method for arranging the coil 40 as in the embodiment illustrated in FIG. 1 to FIG. 4, when the plurality of power converters 30B are connected in parallel, the coils 40 for the number of power converters 30B are necessary.

In contrast, in the embodiment illustrated in FIG. 6, the coil 40 is disposed at a position around the wires 12 that extend in the vertical direction and connect the upper power converter 30B and the lower power converter 30B (both power converters 30B), at which the magnetic fluxes Φ generated by the short-circuit failure are linked with the coil 40. More specifically, in the embodiment illustrated in FIG. 6, since the loop short-circuit current I6 flows, the coil 40 is disposed around the wires 12 extending in the vertical direction in order to pick up the magnetic fluxes Φ in a path of the short-circuit current I6. In other words, the coil 40 is disposed at a position of the wires 12 where the voltage applied to the parasitic inductances $L_1$ between the two power converters 30B connected in parallel can be picked up.

Accordingly, in the embodiment illustrated in FIG. 6, even if a short-circuit failure occurs in any of the two power converters 30B connected in parallel, it is possible to detect the voltage. Further, for example, even in a case where two or more power converters 30B are connected in parallel and a short-circuit failure occurs in any of the power converters 30B, the coil 40 can detect the voltage by being disposed at the position of the wires 12 connecting the power converters 30B.

Note that the coil 40 may be disposed at a position around wires 23 extending in the vertical direction on the alternating-current side, at which the magnetic fluxes Φ generated by the short-circuit failure are linked with the coil 40. For example, the coil 40 may be disposed at a position D in FIG. 6.

As described above, according to the second embodiment illustrated in FIG. 6, it is possible to achieve effects similar to the effects by the embodiment illustrated in FIG. 1 to FIG. 5.

Further, according to the second embodiment illustrated in FIG. 6, the coil 40 is disposed at the position around the wires 12 connecting the plurality of power converters 30B, at which the magnetic fluxes Φ generated by the short-circuit failure are linked with the coil 40. Therefore, it is unnecessary to dispose the coils 40 for the plurality of power converters 30B. Even if the short-circuit failure occurs in any of the power converters 30B, providing one coil 40 makes it possible to detect the short-circuit failure. Thus, according to the second embodiment illustrated in FIG. 6, it is possible to suppress the number of coils 40. Further, it is possible to protect the power conversion system 1B and to prevent failure expansion in the power conversion system 1B, with a simpler and inexpensive configuration.

Modification of Second Embodiment

Figure 7:
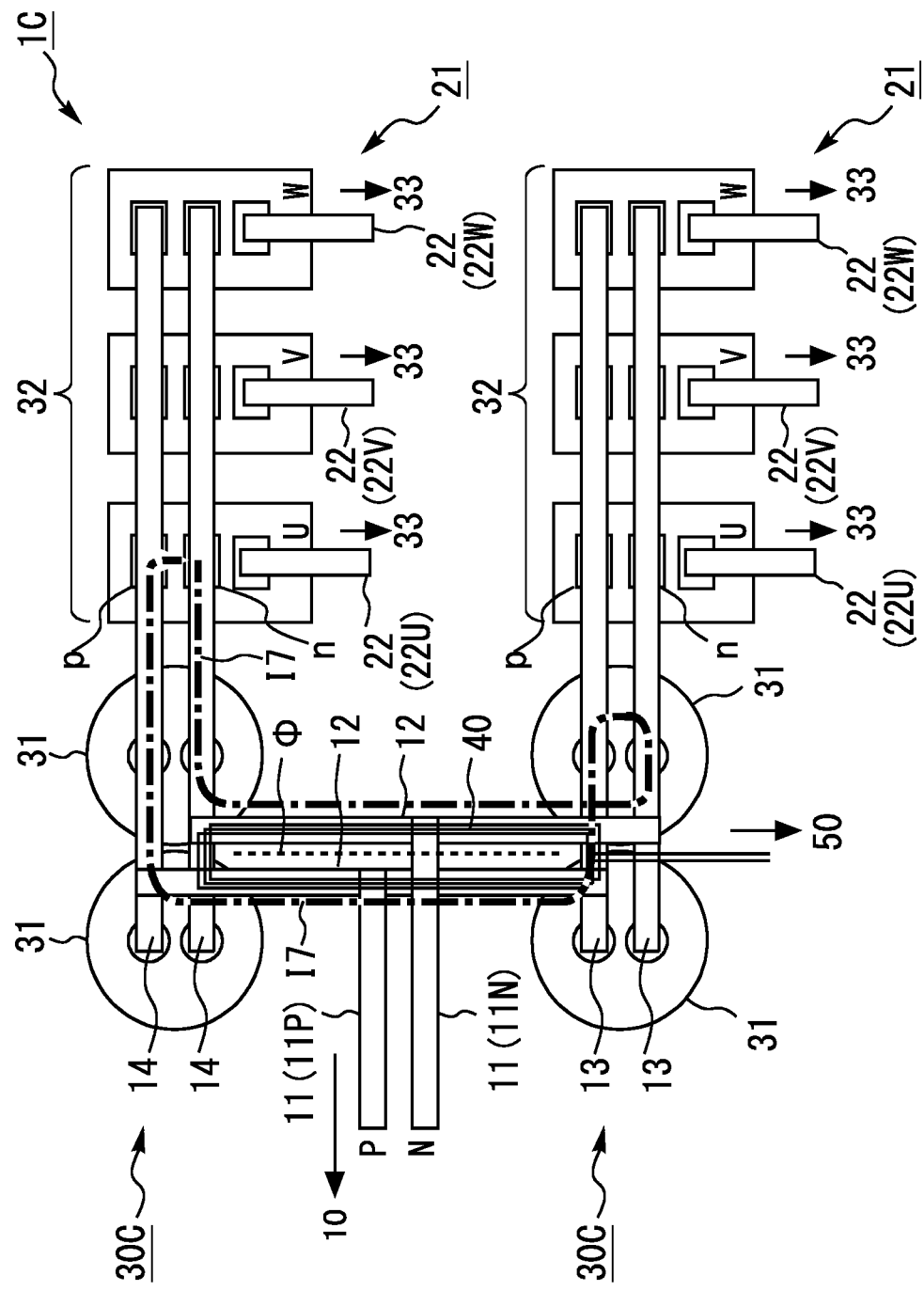
FIG. 7 is a diagram illustrating a configuration example of a power converter according to a modification of the second embodiment.

FIG. 7 is a diagram illustrating a configuration example of power converters 30C according to a modification of the second embodiment. In the embodiment illustrated in FIG. 7, the components same as or similar to the components in the embodiments illustrated in FIG. 1 to FIG. 6 are denoted by the same reference numerals, and detailed description of the components is omitted or simplified. In FIG. 7, for simplification of the drawing, the components same as or similar to the components in the embodiments illustrated in FIG. 1 to FIG. 6 are partially omitted or illustrated in a simplified manner.

Each of the power converters 30C illustrated in FIG. 7 has a configuration substantially similar to the configuration of each of the power converters 30B illustrated in FIG. 6, but some of the components are changed. In each of the two power converters 30C, two direct-current capacitors 31 are disposed, and three semiconductor modules configuring the inverter circuit 32 are disposed. In the upper power converter 30C, the direct-current capacitors 31 and the semiconductor modules (inverter circuit) 32 are connected by busbars 14 configuring wires 14. In the lower power converter 30C, the direct-current capacitors 31 and the semiconductor modules (inverter circuit) 32 are connected by busbars 13 configuring wires 13. Further, the busbars 14 in the upper power converter 30C and the busbars 13 in the lower power converter 30C are connected by busbars 12 configuring the wires 12 extending in the vertical direction. Further, the busbars 12 extending in the vertical direction are connected to the solar cell 10 by the busbars 11 configuring the wires 11.

In the embodiment illustrated in FIG. 7, the coil 40 is disposed at a position around the busbars 12 that extend in the vertical direction and connect the upper power converter 30C and the lower power converter 30C (both power converters 30C), at which the magnetic fluxes Φ generated by the short-circuit failure are linked with the coil 40. More specifically, in the embodiment illustrated in FIG. 7, a loop short-circuit current I7 flows, and the coil 40 is disposed around the busbars 12 extending in the vertical direction in order to pick up the magnetic fluxes Φ in a path of the short-circuit current I7. In other words, the coil 40 is disposed at a position of the busbars 12 where a voltage applied to the parasitic inductances $L_1$ between the two power converters 30C connected in parallel.

As described above, according to the modification of the second embodiment illustrated in FIG. 7, it is possible to achieve effects similar to the effects by the second embodiment illustrated in FIG. 6.

Third Embodiment

Figure 8:
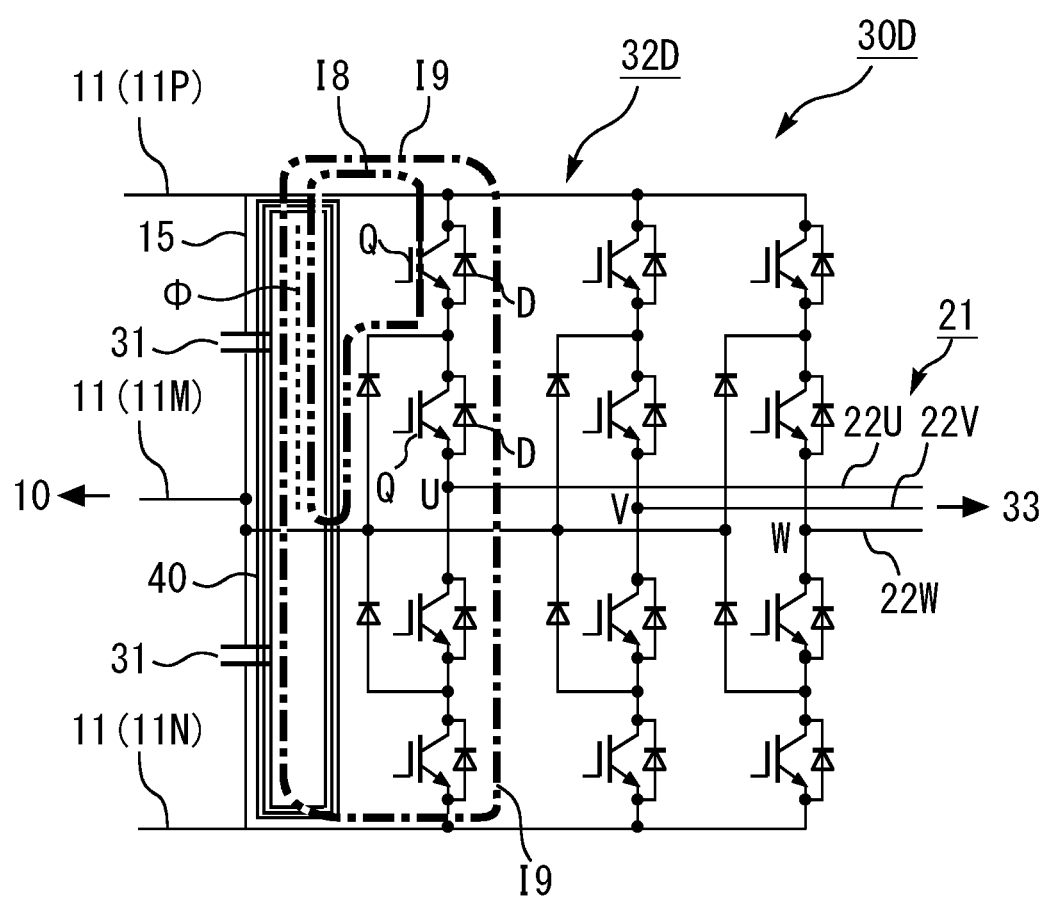
FIG. 8 is a diagram illustrating a configuration example of a power converter according to a third embodiment.

FIG. 8 is a diagram illustrating a configuration example of a power converter 30D according to a third embodiment. In the embodiment illustrated in FIG. 8, the components same as or similar to the components in the embodiments illustrated in FIG. 1 to FIG. 7 are denoted by the same reference numerals, and detailed description of the components is omitted or simplified. In FIG. 8, for simplification of the drawing, the components same as or similar to the components in the embodiments illustrated in FIG. 1 to FIG. 7 are partially omitted or illustrated in a simplified manner.

In the embodiment illustrated in FIG. 8, the power converter 30D includes a neutral-point clamping three-level inverter circuit 32D. In this case, in a case where a short-circuit failure occurs in any of the U-phase semiconductor switching elements Q in FIG. 8, for example, a loop short-circuit current I8 or a loop short-circuit current I9 flow from the direct-current capacitors 31.

In the embodiment illustrated in FIG. 8, the coil 40 is disposed to cover a whole of a wire 15 that extends in a vertical direction in FIG. 8 and connects the positive electrode wire 11P, a neutral-point wire 11M, and the negative electrode wire 11N. Therefore, in the embodiment illustrated in FIG. 8, the coil 40 can pick up the magnetic fluxes Φ in both of paths of the loop short-circuit current I8 and the loop short-circuit current I9 (magnetic fluxes Φ in both of paths are linked with the coil 40). Further, even in a case where the short-circuit failure occurs in any of the semiconductor switching elements Q of the inverter circuit 32D, providing the coil 40 at the position illustrated in FIG. 8 makes it possible to detect the short-circuit failure.

As described above, according to the third embodiment illustrated in FIG. 8, it is possible to achieve effects similar to the effects by the embodiments illustrated in FIG. 1 to FIG. 7.

Fourth Embodiment

Figure 9:
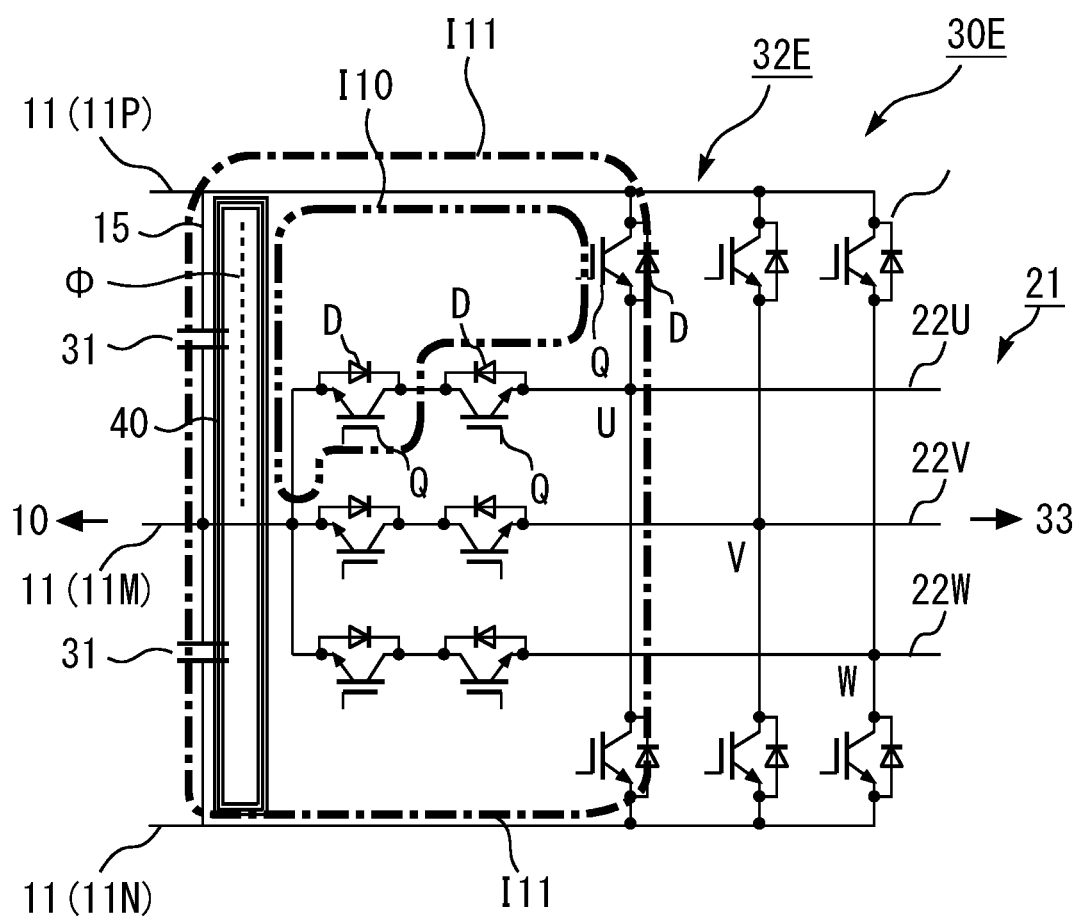
FIG. 9 is a diagram illustrating a configuration example of a power converter according to a fourth embodiment.

FIG. 9 is a diagram illustrating a configuration example of a power converter 30E according to a fourth embodiment. In the embodiment illustrated in FIG. 9, the components same as or similar to the components in the embodiments illustrated in FIG. 1 to FIG. 8 are denoted by the same reference numerals, and detailed description of the components is omitted or simplified. In FIG. 9, for simplification of the drawing, the components same as or similar to the components in the embodiments illustrated in FIG. 1 to FIG. 8 are partially omitted or illustrated in a simplified manner.

In the embodiment illustrated in FIG. 9, the power converter 30E includes a neutral-point switching three-level inverter circuit 32E. In this case, in a case where a short-circuit failure occurs in any of the U-phase semiconductor switching elements Q in FIG. 9, for example, a loop short-circuit current I10 or a loop short-circuit current I11 illustrated in FIG. 9 flow from the direct-current capacitors 31.

In the embodiment illustrated in FIG. 9, the coil 40 is disposed to cover the whole of the wire 15 that extends in the vertical direction in FIG. 9 and connects the positive electrode wire 11P, the neutral-point wire 11M, and the negative electrode wire 11N. Therefore, in the embodiment illustrated in FIG. 9, the coil 40 can pick up the magnetic fluxes Φ in both of paths of the loop short-circuit current I10 and the loop short-circuit current I11 (magnetic fluxes Φ in both of paths are linked with the coil 40). Further, even in a case where the short-circuit failure occurs in any of the semiconductor switching elements Q of the inverter circuit 32E, providing the coil 40 at the position illustrated in FIG. 9 makes it possible to detect the short-circuit failure.

As described above, according to the fourth embodiment illustrated in FIG. 9, it is possible to achieve effects similar to the effects by the third embodiment illustrated in FIG. 8.

Hardware Configuration Example

Figure 10:
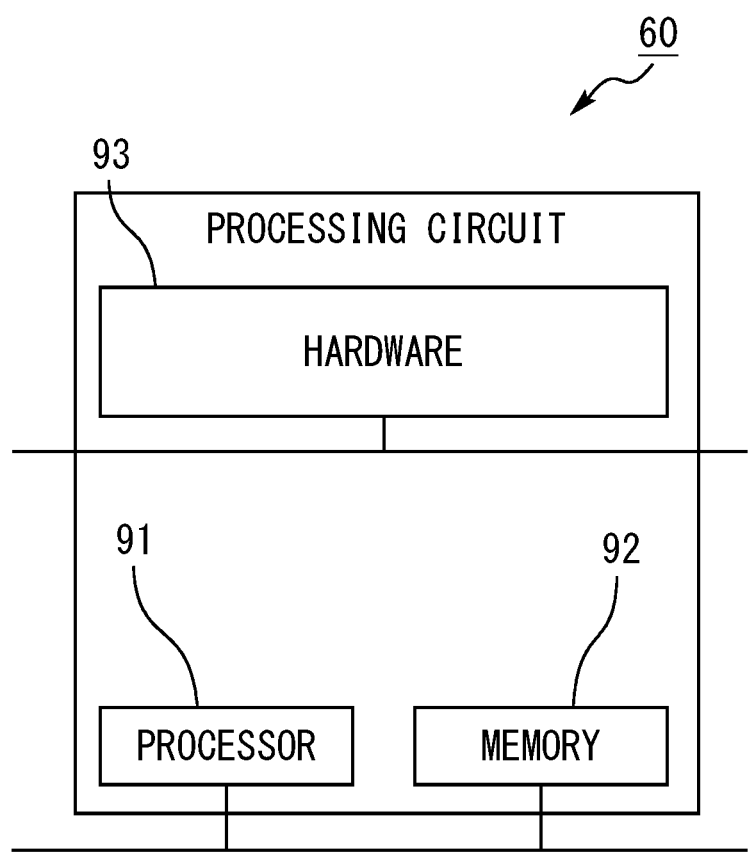
FIG. 10 is a conceptual diagram illustrating a hardware configuration example of a processing circuit including the control apparatus according to each of the embodiments illustrated in FIG. 1 to FIG. 9.

FIG. 10 is a conceptual diagram illustrating a hardware configuration example of a processing circuit held by the control apparatus 60 according to each of the embodiments illustrated in FIG. 1 to FIG. 9. The above-described functions are realized by the processing circuit. As one aspect, the processing circuit includes at least one processor 91 and at least one memory 92. As another aspect, the processing circuit includes at least one piece of dedicated hardware 93.

In a case where the processing circuit includes the processor 91 and the memory 92, each of the functions is realized by software, firmware, or a combination of software and firmware. At least one of the software and the firmware is described as a program. At least one of the software and the firmware is stored in the memory 92. The processor 91 reads out and executes a program stored in the memory 92, to realize each of the functions.

In a case where the processing circuit includes the dedicated hardware 93, the processing circuit is, for example, a single circuit, a composite circuit, a programmed processor, or a combination thereof. Each of the functions is realized by the processing circuit.

A part or all of the functions of the control apparatus 60 may be configured by the hardware or configured as programs executed by the processor. In other words, the control apparatus 60 can be realized by a computer and programs, and the programs can be stored in a storage medium or provided through a network.

Comparative Example

Figure 11:
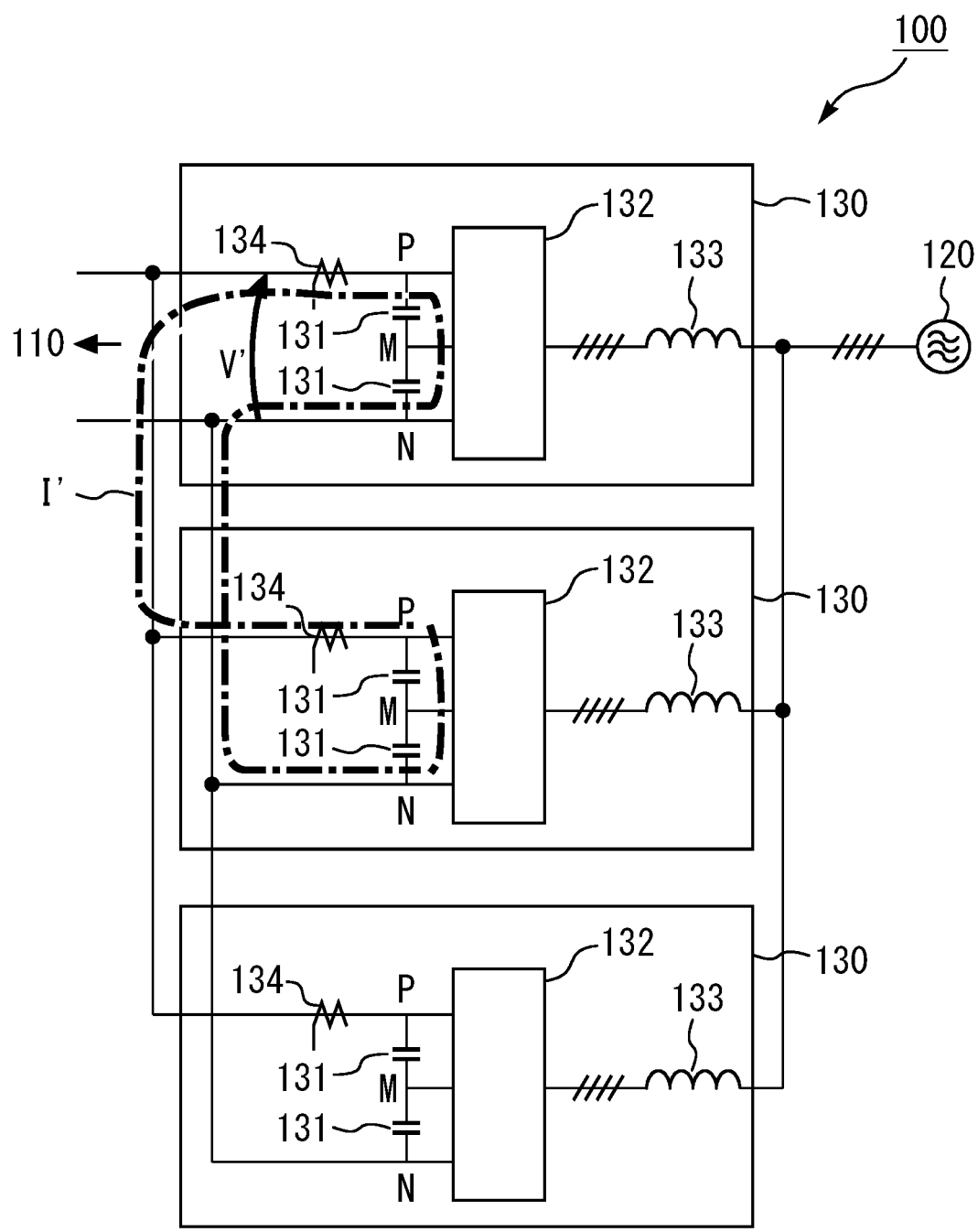
FIG. 11 is a diagram illustrating a configuration example of a power conversion system according to a comparative example.

FIG. 11 is a diagram illustrating a configuration example of a power conversion system 100 according to a comparative example. In the embodiment illustrated in FIG. 11, the components same as or similar to the components in the embodiments illustrated in FIG. 1 to FIG. 10 are denoted by the same reference numerals, and detailed description of the components is omitted or simplified.

In the power conversion system 100 according to the comparative example illustrated in FIG. 11, a plurality of unit power converters 130 are connected in parallel. Direct-current sides of the plurality of unit power converters 130 are connected to an unillustrated direct-current power supply 110, and alternating-current sides thereof are connected to a system 120. Each of the plurality of unit power converters 130 includes an inverter circuit 132, direct-current capacitors 131, and an alternating-current reactor 133. Each of the inverter circuits 132 includes a plurality of unillustrated switching elements.

Positive electrode P sides of the plurality of unit power converters 130 are connected to one another, and negative electrode N sides of the plurality of unit power converters 130 are connected to one another, whereas neutral points M of the plurality of unit power converters 130 are not connected to one another. Further, in each of the plurality of unit power converters 130, a current sensor 134 is provided on the positive electrode P side and detects a current flowing on the positive electrode P side. Note that the current sensor 134 may be provided on the negative electrode N side, and detect a current flowing on the negative electrode N side.

In such a comparative example illustrated in FIG. 11, for example, in a case where a short-circuit failure occurs in the inverter circuit 132 of the uppermost unit power converter 130 in FIG. 11, for example, a loop short-circuit current I' illustrated in FIG. 11 flows from the direct-current capacitors 131 connected in parallel. Therefore, in the comparative example illustrated in FIG. 11, the short-circuit current I' is detected by the current sensors 134, and the power conversion system 100 is protected. In the comparative example illustrated in FIG. 11, however, a current flows through the positions where the current sensors 134 are disposed, during normal operation without failure. Therefore, the current sensors 134 each having a rated current corresponding thereto are necessary, which may lead to high cost. Further, the short-circuit current I' is delayed relative to the voltage variation occurring when the short circuit occurs. Therefore, in the comparative example illustrated in FIG. 11, detection of the short-circuit failure is delayed as compared with the method for detecting the voltage variation.

On the other hand, to directly measure the voltage variation caused by the short-circuit failure in the comparative example illustrated in FIG. 11, it is necessary to connect an unillustrated electric wire between the positive electrode P side and the negative electrode N side without insulation, and to measure a voltage value V' by an unillustrated voltage sensor. At this time, for example, it is not uncommon that the voltage of the main circuit of each of the unit power converters 130 is about 1000 volts. Therefore, it is necessary to use an electric wire having insulation property corresponding thereto, and to secure an insulation distance corresponding thereto. This may lead to high cost.

In the method for detecting the short-circuit current I' according to the comparative example illustrated in FIG. 11, it is necessary to provide the current sensor 134 in each of the plurality of unit power converters 130. In the method for directly measuring the voltage value V' according to the comparative example illustrated in FIG. 11, it is necessary to provide the unillustrated electric wire and the unillustrated voltage sensor in each of the plurality of unit power converters 130. Thus, it is necessary to provide the current sensors 134, the unillustrated electric wires, and the voltage sensors for the number of unit power converters 130, which may lead to high cost.

In contrast, according to the embodiments illustrated in FIG. 1 to FIG. 10, the coil 40 is disposed at the position around the wires 11 or the like where the magnetic fluxes Φ generated by the short-circuit failure are linked with the coil 40, and the short-circuit failure is detected through detection of the voltage value V of the voltage across the coil 40 by the voltage detection circuit 50. In addition, the coil 40 to detect the magnetic fluxes Φ generated when the short-circuit failure occurs can be created by winding a common electric wire several times. Thus, according to the embodiments illustrated in FIG. 1 to FIG. 10, it is possible to protect the power conversion system 1 and the like with a simple and inexpensive configuration as compared with the comparative example illustrated in FIG. 11.

Further, according to the embodiments illustrated in FIG. 1 to FIG. 10, it is possible to detect the short-circuit failure at high speed in principle as compared with the method for detecting the short-circuit current I' according to the comparative example illustrated in FIG. 11.

Further, according to the embodiments illustrated in FIG. 1 to FIG. 10, the coil 40 to detect the magnetic fluxes Φ generated when the short-circuit failure occurs is electrically insulated from the main circuit. Thus, according to the embodiments illustrated in FIGS. 1 to 10, it is possible to protect the power conversion system 1 and the like with a simple and inexpensive configuration as compared with the method for directly measuring the voltage value V' according to the comparative example illustrated in FIG. 11.

Further, according to the embodiments illustrated in FIG. 1 to FIG. 10, unlike the comparative example illustrated in FIG. 11, the coil 40 can be installed afterward, and the existing power conversion system 1 and the like can be protected afterword.

Further, according to the embodiments illustrated in FIG. 1 to FIG. 10, unlike the comparative example illustrated in FIG. 11, even in a case where the plurality of power converters 30 are connected in parallel and a short-circuit failure occurs in any of the power converters 30, providing one coil 40 makes it possible to detect the short-circuit failure. Thus, according to the embodiments illustrated in FIG. 1 to FIG. 10, it is possible to protect the power conversion system 1 and the like with a simpler and inexpensive configuration as compared with the comparative example illustrated in FIG. 11.

Supplementary Matters of Embodiments

As described above, according to the embodiments illustrated in FIG. 1 to FIG. 10, as an aspect of the present disclosure, the power conversion systems 1 to 1E (power converters 30 to 30E) and the control apparatus 60 held by each of the power conversion systems 1 to 1E are described as examples; however, the aspect is not limited thereto. The present disclosure can be realized as a short-circuit failure detection method including processing steps by the units of the control apparatus 60.

Further, the present disclosure can be realized as a short-circuit failure detection program causing a computer to execute processing steps by the units of the control apparatus 60.

Further, the present disclosure can be realized as a storage medium (non-transitory computer-readable medium) storing the short-circuit failure detection program. The short-circuit failure detection program can be distributed by being stored in a removable medium such as a CD (Compact Disc), a DVD (Digital Versatile Disc), and a USB (Universal Serial Bus) memory. Note that the short-circuit failure detection program may be uploaded to a network through an unillustrated network interface held by the control apparatus 60 or the like, and may be downloaded from the network and stored in the storage unit 70 or the like.

The above-described detailed description will clarify features and advantages of the embodiments. This is for the purpose of showing that the claims cover the features and the advantages of the embodiments as described above without departing from the spirit and the scope of rights. Further, those skilled in the art should be able to easily conceive any improvements and changes. Accordingly, the scope of the inventive embodiments is not intended to be limited to the above description, and the claims can also be based on appropriate improvements and equivalents included in the scope disclosed in the embodiments.

REFERENCE SIGNS LIST

1, 1A, 1B, 1C, 1D, 1E Power conversion system
10 Direct-current power supply (solar cell)
11 Wire (busbar)
11M Neutral-point wire
11N Negative electrode wire
11P Positive electrode wire
12 Wire (busbar)
13 Wire (busbar)
14 Wire (busbar)
15 Wire (busbar)
20 Alternating-current power system (system)
21 Alternating-current circuit (three-phase alternating-current circuit)
22 Wire (busbar)
22U U-phase wire
22V V-phase wire
22W W-phase wire
23 Wire (busbar)
30, 30A, 30B, 30C, 30D, 30E Power converter
31 Direct-current capacitor
32, 32A, 32B, 32C, 32D, 32E Inverter circuit (semiconductor module)
33 Alternating-current reactor
40 Coil
50 Voltage detection circuit
60 Control apparatus
61 Voltage acquisition unit
62 Failure detection unit
63 Failure alarming unit
64 Operation control unit
65 PWM control unit
70 Storage unit
91 Processor
92 Memory
93 Hardware
100 Power conversion system
120 System
130 Unit power converter
131 Direct-current capacitor
132 Inverter circuit
133 Alternating-current reactor
134 Current sensor
C Capacitor
D Reflux diode
I, I', I1 to I11 Short-circuit current
$i_1$, $i_2$ Current
k Coupling degree (coupling coefficient)
$L_1$ Parasitic inductance (self-inductance)
$L_2$ Self-inductance
M Mutual inductance
M Neutral point
N Negative electrode
P Positive electrode
P1 Connection point
Q Semiconductor switching element
R Load resistance
V, V' Voltage value
$v_1$, $v_2$ Voltage
Φ Magnetic flux

The invention claimed is:

1. A power conversion system comprising:
   a power converter connected to a power supply or a capacitor through a wire;
   a coil disposed at a position around the wire where a magnetic flux is linked with the coil when a short-circuit failure in which a voltage of the power supply or the capacitor is short-circuited occurs, the magnetic flux being generated by the short-circuit failure;
   a voltage detection circuit configured to detect a voltage value of a voltage across the coil; and
   a control apparatus, wherein
   the control apparatus includes a voltage acquisition circuit configured to acquire the voltage value of the voltage across the coil detected by the voltage detection circuit, and a failure detection circuit configured to detect a short-circuit failure of the power converter, based on the voltage value acquired by the voltage acquisition circuit, and
   when a plurality of the power converters connected in parallel are connected to the power supply or the capacitor through the wire, the coil is disposed at a position around the wire connecting the plurality of the power converters, a magnetic flux generated by the short-circuit failure being linked with the coil at the position.

2. The power conversion system according to claim 1, wherein the failure detection circuit detects the short-circuit failure of the power converter when the voltage value exceeds a predetermined threshold.

3. The power conversion system according to claim 2, wherein the control apparatus further includes an operation control circuit configured to, when the failure detection circuit detects the short-circuit failure of the power converter, output an operation instruction to protect and stop the power converter.

4. The power conversion system according to claim 1, wherein the control apparatus further includes an operation control circuit configured to, when the failure detection circuit detects the short-circuit failure of the power converter, output an operation instruction to protect and stop the power converter.

5. The power conversion system according to claim 1, wherein
when the voltage value exceeds a predetermined threshold, the failure detection circuit detects the short-circuit failure of the power converter, and
the control apparatus further includes an operation control circuit configured to, when the failure detection circuit detects the short-circuit failure of the power converter, output an operation instruction to protect and stop the power converter.

6. The power conversion system according to claim 1, wherein the wire is any of an electric wire, a busbar, and a printed-circuit board wire.

7. The power conversion system according to claim 1, wherein the coil is any of an electric wire, a busbar, and a printed-circuit board wire.

8. The power conversion system according to claim 7, wherein the coil is electrically insulated from a main circuit.

9. The power conversion system according to claim 1, wherein the coil is electrically insulated from a main circuit.

* * * * *